G. W. Blake,
Belt Fastener,
No. 3,065. Reissued Aug. 4, 1868.
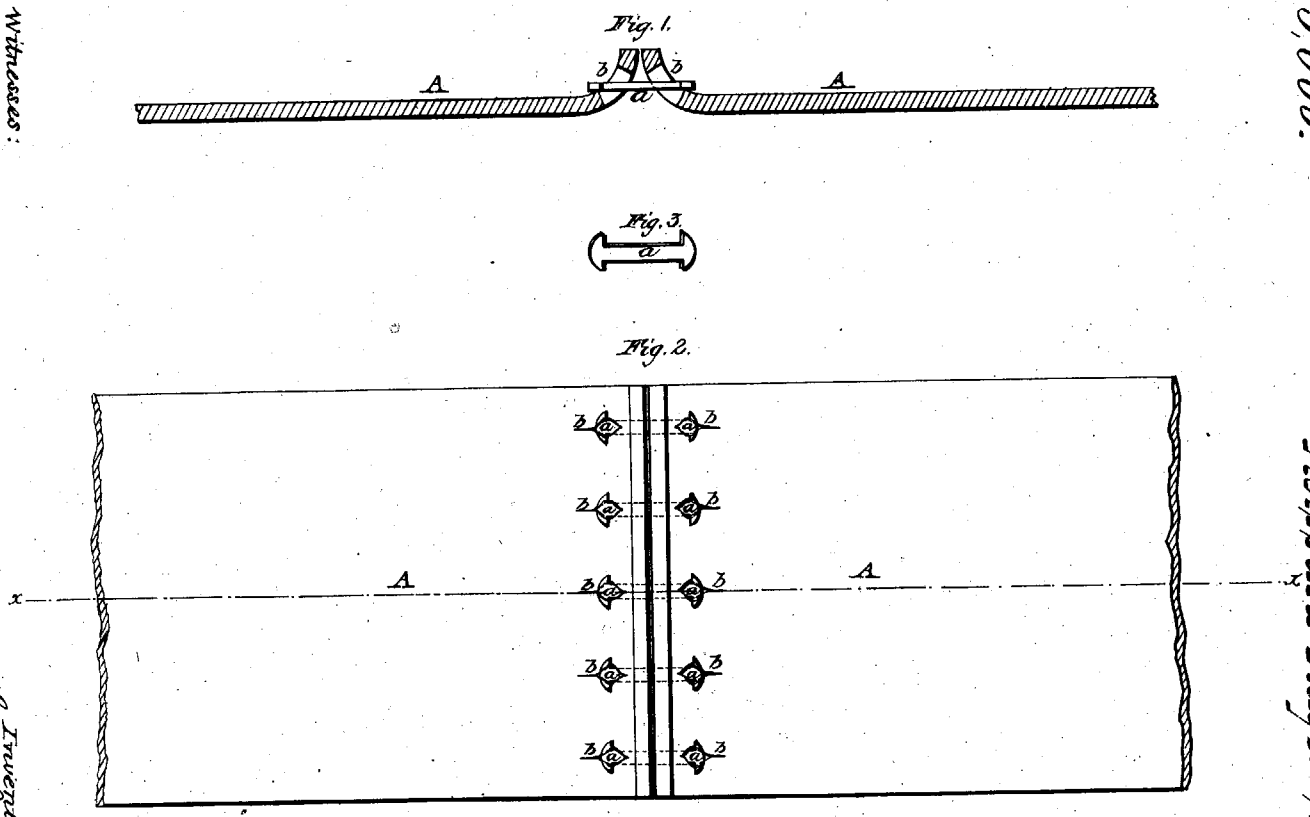
Witnesses:
F. W. Coombs
R. S. Spencer
Inventor:
G. W. Blake
per Munn & Co
Attorneys
N. PETERS, PHOTO-LITHOGRAPHER, WASHINGTON, D. C.

UNITED STATES PATENT OFFICE.

JOHN ASHTON GREENE AND HENRY A. TWEED, OF NEW YORK, N. Y., ASSIGNEES, BY MESNE ASSIGNMENTS, OF G. W. BLAKE.

IMPROVED BELT-FASTENING.

Specification forming part of Letters Patent No. 855, dated March 26, 1861; Reissue No. 3,065, dated August 4, 1868.

*To all whom it may concern:*

Be it known that GEORGE W. BLAKE, of East Pepperels, in the county of Middlesex and State of Massachusetts, has invented a a new and Improved Method of and Means for Fastening Belts and Bands; and the following is hereby declared to be a full, clear, and exact description of the same, reference being had to the accompanying drawings, making a part of this specification, in which—

Figure 1 is a longitudinal section through two ends of a belt secured together in accordance with this invention. Fig. 2 is a top view of the ends of a belt secured as in Fig. 1. Fig. 3 represents a perspective of one of the belt-fastenings.

Similar letters of reference indicate corresponding parts.

To enable those skilled in the art to make and use this invention, the following description is given of the manner in which the same is or may be carried into effect.

A A represent the contiguous ends of two sections of leather belting, which are secured together by studs *a a a a a*, as represented in Figs. 1 and 2 of the drawings. The ends of the sections of belting to be united are first cut off square; then, with a suitable instrument, short slits *b b b* are cut through the ends of each belt, as far back from the edge as may be desired. These slits should be cut in the direction of the length of the belt, and care should be taken that the distance between the slits of one section should correspond with the distance between the slits through the end of the opposite section, thereby bringing the longitudinal edges of the two sections of belting in a line with each other. These slits should all be made about the same length, which is determined by the size of the heads of the studs used in forming the junction of the two sections of belting.

The studs *a a*, which are used to connect the ends of the belting together, consist of flat pieces or shanks of metal of a suitable length and strength, terminating at each end in a segmental head, as represented in Fig. 3 of the drawings. The size of these double-headed studs must be determined by the size and strength of the belting to which they are to be applied, and the number of studs used will depend upon the width of the belt. These studs may be readily punched out from a sheet of metal with a suitable instrument, and they can thus be made at a trifling cost.

When the ends of the belt-sections which are to be united are prepared with their slits *b b*, as before described, the studs are all passed through the slits *b*, and then turned so as to lie flat on the outside surface of the belting, as represented in Figs. 1 and 2 of the drawings, in which position they will remain, their heads preventing the belt from being drawn apart at the junction.

In order to detach the ends of the belt thus united, the studs are turned at right angles to the positions represented in Figs. 1 and 2—that is to say, in the positions in which they were placed to enter the slits—and the ends of the belt can then be drawn apart.

These fastening-studs can be made with great cheapness and ease. They take a firm hold upon the ends of the belt, and they can be employed with belts or bands intended for any and every purpose.

What is claimed as new, and as the invention of the said G. W. BLAKE, is as follows:

1. As an article of manufacture, double-headed studs, shaped, substantially as described, with a view to the uses herein set forth.

2. The method of fastening or uniting the ends of belts by a series of double-headed studs, substantially as herein shown and set forth.

3. The use, in combination with the ends of belts or bands, of double-headed studs, substantially as and for the purposes herein described.

In testimony whereof we have signed our names to this specification in the presence of two subscribing witnesses.

JOHN ASHTON GREENE.
HENRY A. TWEED.

Witnesses:
JOHN W. MCCOY,
TRUMAN H. BALDWIN.